(12) United States Patent
Duckworth et al.

(10) Patent No.: US 11,371,685 B2
(45) Date of Patent: *Jun. 28, 2022

(54) CANOPY LUMINAIRE AND LUMINAIRE MOUNTING ASSEMBLY

(71) Applicant: Hubbell Lighting, Inc., Shelton, CT (US)

(72) Inventors: Jason Duckworth, Simpsonville, SC (US); Jason Purucker, Greenville, SC (US); David Venhaus, Greenvile, SC (US)

(73) Assignee: Hubbell Lighting, Inc., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,145

(22) Filed: Jun. 25, 2020

(65) Prior Publication Data

US 2020/0326063 A1 Oct. 15, 2020

Related U.S. Application Data

(63) Continuation of application No. 15/496,705, filed on Apr. 25, 2017, now Pat. No. 10,697,622.

(Continued)

(51) Int. Cl.
*F21V 23/00* (2015.01)
*F21S 9/02* (2006.01)
(Continued)

(52) U.S. Cl.
CPC ............ *F21V 23/008* (2013.01); *F21S 9/022* (2013.01); *H01R 13/443* (2013.01); *H05B 47/19* (2020.01); *F21S 8/04* (2013.01); *F21V 23/001* (2013.01); *F21V 23/0435* (2013.01); *F21V 23/0471* (2013.01); *F21W 2131/10* (2013.01);
(Continued)

(58) Field of Classification Search
CPC ..... H01R 13/44; H01R 13/443; F21V 23/001; F21V 23/008; F21V 23/0435; F21V 23/0471; F21S 9/022; F21S 8/04; F21S 8/043; F21Y 2105/16; F21Y 2115/10; F21W 2131/10
See application file for complete search history.

(56) References Cited

U.S. PATENT DOCUMENTS 5,214,354 A 5/1993 Johnson
6,394,628 B1 5/2002 Wang
(Continued)

OTHER PUBLICATIONS

PCT/US2017/029374 International Search Report and Written Opinion dated Sep. 1, 2017 (12 pages).
(Continued)

*Primary Examiner* — Alan B Cariaso
(74) *Attorney, Agent, or Firm* — Michael Best & Friedrich LLP

(57) ABSTRACT

A luminaire includes a luminaire housing having a lower wall, an upper wall, and a plurality of side walls defining a first interior. A first control component is positioned in the interior. A light emitter is connected to the housing and operatively connected to the control component. A control module is connected to an exterior of the luminaire housing. The control module includes a base and a cover defining a second interior, and a second control component positioned in the second interior.

20 Claims, 11 Drawing Sheets

Related U.S. Application Data

(60) Provisional application No. 62/326,901, filed on Apr. 25, 2016.

(51) Int. Cl.
 *H01R 13/443*   (2006.01)
 *H05B 47/19*    (2020.01)
 *F21V 23/04*    (2006.01)
 *H05B 47/115*   (2020.01)
 *F21W 131/10*   (2006.01)
 *F21Y 105/16*   (2016.01)
 *F21Y 115/10*   (2016.01)
 *F21S 8/04*    (2006.01)

(52) U.S. Cl.
 CPC ....... *F21Y 2105/16* (2016.08); *F21Y 2115/10* (2016.08); *H05B 47/115* (2020.01)

(56) References Cited

U.S. PATENT DOCUMENTS

| | | |
|---|---|---|
| 6,525,890 B1 | 2/2003 | Wang |
| 6,715,903 B2 | 4/2004 | Wang |
| 6,755,559 B2 | 6/2004 | Wang |
| 7,063,445 B2 | 6/2006 | Wang |
| 7,490,960 B1 * | 2/2009 | Fiorino .............. F21V 23/0442 362/276 |
| 8,143,567 B2 | 3/2012 | Williams |
| 8,901,496 B2 | 12/2014 | Aurongzeb |
| 8,928,487 B2 | 1/2015 | Dyer |
| 9,273,860 B2 | 3/2016 | Pratt |
| 9,464,790 B2 | 10/2016 | Badley |
| 9,523,491 B2 | 12/2016 | Bailey |
| 9,625,125 B1 * | 4/2017 | Bryant .................... F21S 8/033 |
| 10,240,760 B1 * | 3/2019 | Lehman .................... F21S 8/00 |
| 10,697,622 B2 * | 6/2020 | Duckworth ........... F21V 23/008 |
| 2006/0176685 A1 | 8/2006 | Galli et al. |
| 2010/0020550 A1 | 1/2010 | Kawashima |
| 2011/0026249 A1 * | 2/2011 | Wylde ................... F21V 7/0025 362/240 |
| 2012/0087118 A1 | 4/2012 | Bailey |
| 2012/0248119 A1 | 10/2012 | Zhao et al. |
| 2012/0306377 A1 * | 12/2012 | Igaki .................. F21V 23/0471 315/151 |
| 2013/0039055 A1 * | 2/2013 | Wilson ..................... B60Q 3/74 362/235 |
| 2013/0278146 A1 | 10/2013 | Wilsher et al. |
| 2014/0001952 A1 * | 1/2014 | Harris .................... H05B 47/18 315/51 |
| 2014/0003066 A1 | 1/2014 | Hayashi et al. |
| 2014/0254144 A1 | 9/2014 | Boomgaarden |
| 2014/0268720 A1 * | 9/2014 | Dungan ................ F21V 23/026 362/218 |
| 2015/0138784 A1 * | 5/2015 | Pratt .................. F21V 23/0464 362/373 |
| 2015/0351187 A1 * | 12/2015 | McBryde ............. H05B 45/325 315/185 R |
| 2015/0351205 A1 * | 12/2015 | Clark ................... H05B 47/115 315/149 |
| 2016/0073479 A1 * | 3/2016 | Erchak ................ H05B 47/175 315/51 |
| 2016/0323981 A1 * | 11/2016 | Clark ...................... F21V 23/04 |
| 2017/0294113 A1 * | 10/2017 | McNabb ................ G08C 17/02 |

OTHER PUBLICATIONS

Office Action mailed in corresponding MX application MX/a.2018/013047 dated Apr. 29, 2021 (3 pages.).

* cited by examiner

CANOPY LUMINAIRE AND LUMINAIRE MOUNTING ASSEMBLY

RELATED APPLICATION(S)

This application is a continuation of U.S. Ser. No. 15/496,705, filed Apr. 25, 2017, which is based on U.S. Provisional Application Ser. No. 62/326,901, filed Apr. 25, 2016, the disclosure of which is incorporated herein by reference in its entirety and to which priority is claimed.

FIELD

Various exemplary embodiments relate to light fixtures or luminaires, for example luminaires for overhead canopy structures.

BACKGROUND

Light fixtures, or luminaires, are used with electric light sources to provide an aesthetic and functional housing in both interior and exterior applications. For example, canopy luminaires are designed to provide a downward and outward distribution for a wide variety of applications, such as exterior illumination of gasoline service stations, convenience stores and drive-through restaurants.

Canopy luminaires typically include a box-like canopy fixture housing mounted to a horizontal ceiling or canopy support structure for enclosing and supporting lighting components and related structure of the canopy luminaire. Canopy luminaire assemblies generally comprise relatively high power light sources to distribute a large amount of light to outdoor areas.

SUMMARY

According to an exemplary embodiment, a luminaire includes a luminaire housing having a lower wall, an upper wall, and a plurality of side walls defining a first interior. A first control component is positioned in the interior. A light emitter is connected to the housing and operatively connected to the control component. A control module is connected to an exterior of the luminaire housing. The control module includes a base and a cover defining a second interior, and a second control component positioned in the second interior.

According to another exemplary embodiment, a luminaire includes a luminaire housing having a lower wall, an upper wall, and a plurality of side walls defining a first interior. The upper wall includes a first connecting feature for pivotally connecting to a mounting bracket and a second connecting feature for releasably connecting to the mounting bracket. A first control component is positioned in the interior. A light emitter is connected to the housing and operatively connected to the control component.

According to another exemplary embodiment, a luminaire includes a luminaire housing having a lower wall, an upper wall, and a plurality of side walls defining a first interior. A driver is positioned in the interior. A light emitter is connected to the lower wall. A lens is connected to the lower wall over the light emitter. A control module is connected to the luminaire housing. The control module includes a base, a first cover plate having a first configuration selectively connectable to the base, and a second cover plate having a second configuration selective connectable to the base.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

In an exemplary embodiment, a luminaire includes a housing 10 containing one or more control components, a light emitter 12 connected to the housing 10 and a lens 14 connected to the housing 10. A sensor 16 extends through the lens 14, for example an occupancy sensor, daylight sensor, or other type of sensor. Sensors can also be positioned at other parts of the housing 10, for example a photocell extending from the side of the housing.

Figure 1:
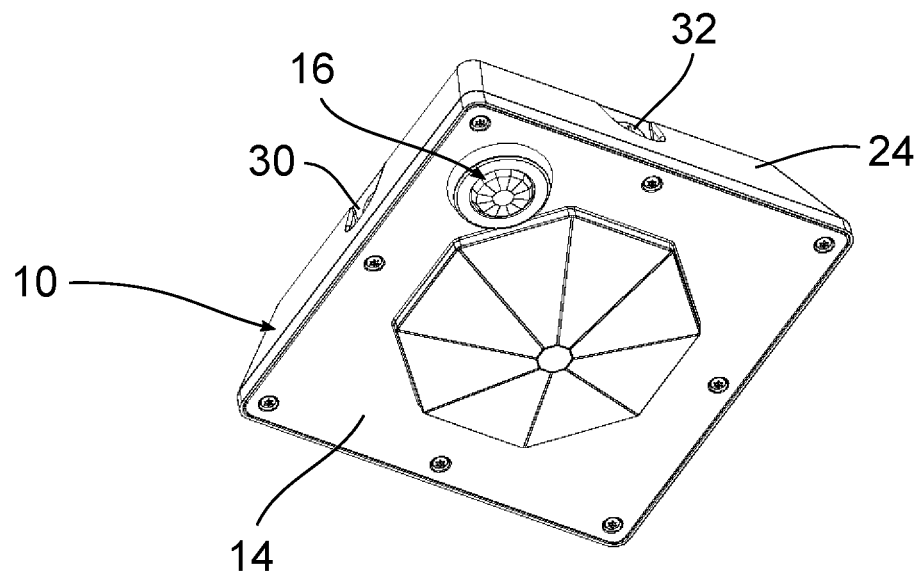
FIG. 1 is a bottom perspective view of an exemplary luminaire.
Figure 2:
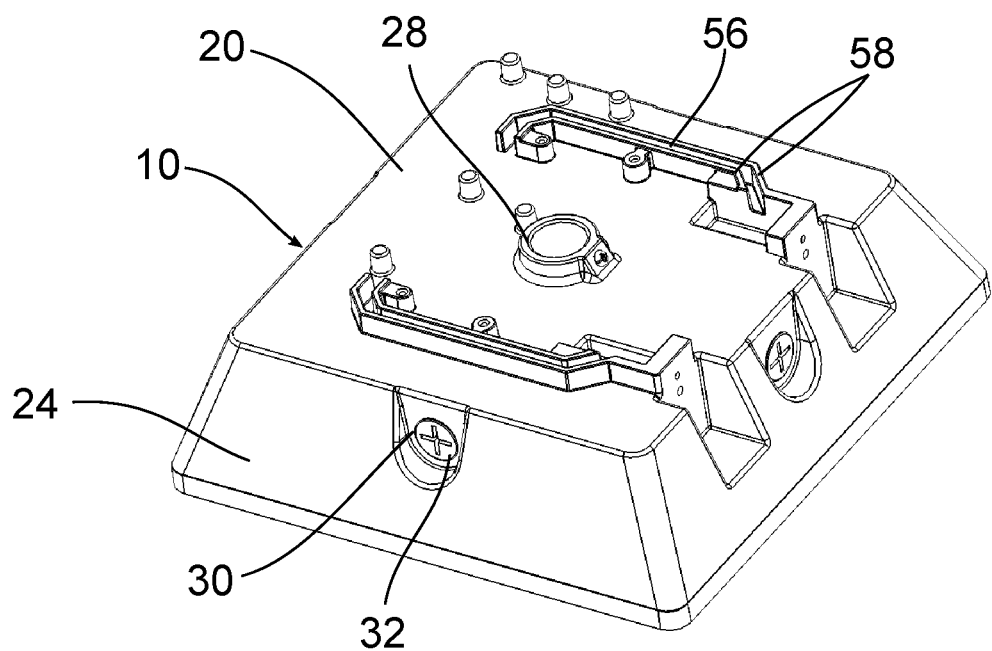
FIG. 2 is atop perspective view of FIG. 1.

As shown in FIGS. 1 and 2, the housing 10 includes an upper wall 20, a lower wall 22, and a plurality of side walls 24 defining an interior compartment. A top aperture 28 extends through the upper wall 20 and a one or more side apertures 30 extend through one or more of the side walls 24. In an exemplary embodiment, a side aperture 30 is associated with each side wall 24. The top aperture 28 and the side apertures 20 act as conductor conduits. Plugs or gaskets 32 can be positioned in the apertures 28, 30 when not in use. The apertures 28, 30 can also include a threaded portion for example an internal thread. The threaded portion can receive a mounting component, such as a mounting hook or a pendant mount, or other threaded features such as conduits.

Figure 3:
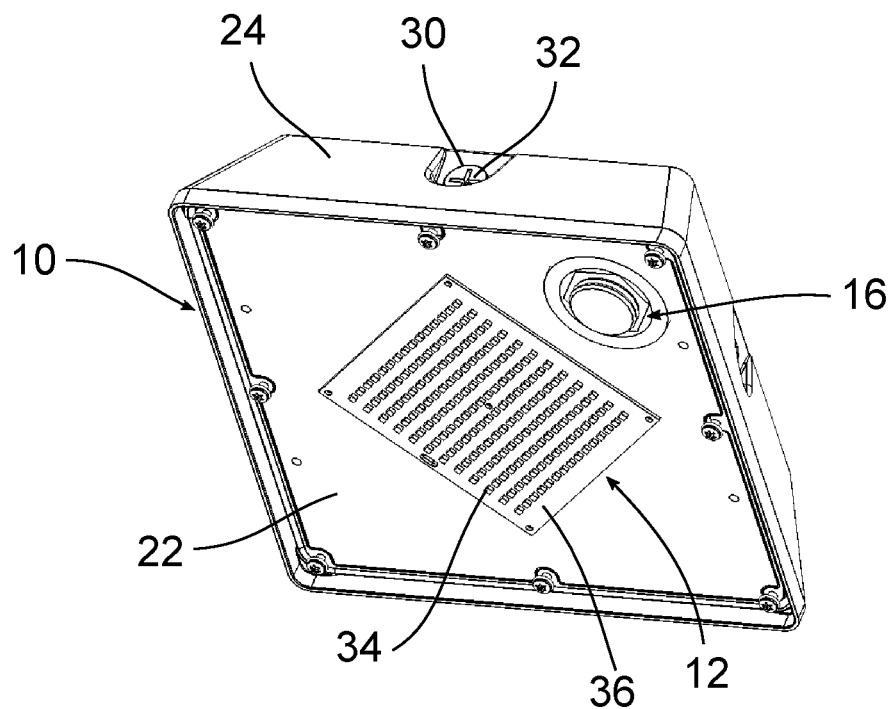
FIG. 3 is a bottom perspective view of the luminaire of FIG. 1 with the lens removed.

FIG. 3 shows the lens 14 removed, exposing the lower wall 22 of the housing 10. At least a portion of the light emitter 12 is connected to the lower wall 22. For example, the light emitter 12 can include a plurality of light emitting diodes (LEDs) 34 mounted on a printed circuit board (PCB) 36. The PCB can be mounted on a heat sink plate positioned between the PCB and the lower wall 22. Different types, sizes, shapes, and configurations of light emitters can be used. The light emitter 12 can be configured to have different outputs, for example between approximately 3,000 and approximately 7,500 lumens.

Different control components can be positioned in the interior compartment of the housing 10 to control the output of the light emitter 12. The control components can include, but are not limited to any combination of: one or more drivers, optionally mounted on a heat sink plate; a motion sensor, a surge protector (serial or parallel protection); a photocell (universal or voltage specific); optional battery backup for emergency lighting (with or without heater); a control board for the battery backup; a circuit board for the battery backup and test button; control modules; and surge protectors. The control modules can be wired or wireless control modules capable of communicating with a user at a remote location over the network and adjusting the operation of the light emitters 12.

Figure 4:
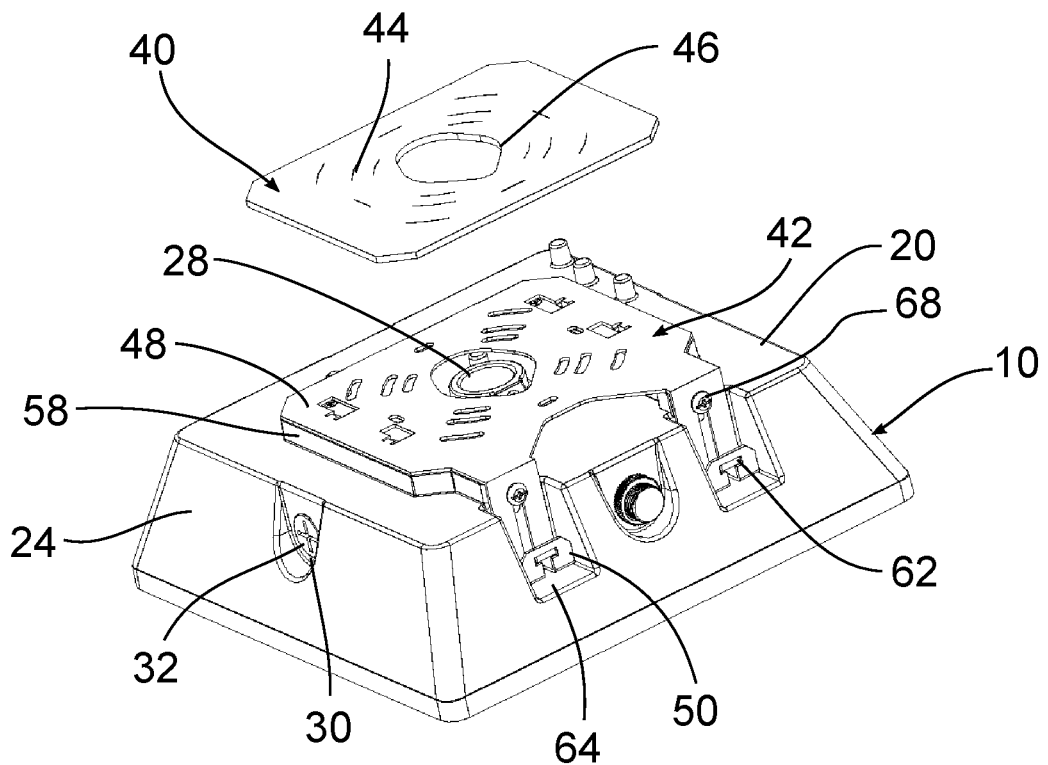
FIG. 4 is atop perspective view of the luminaire of FIG. 1 and amounting assembly.
Figure 5:
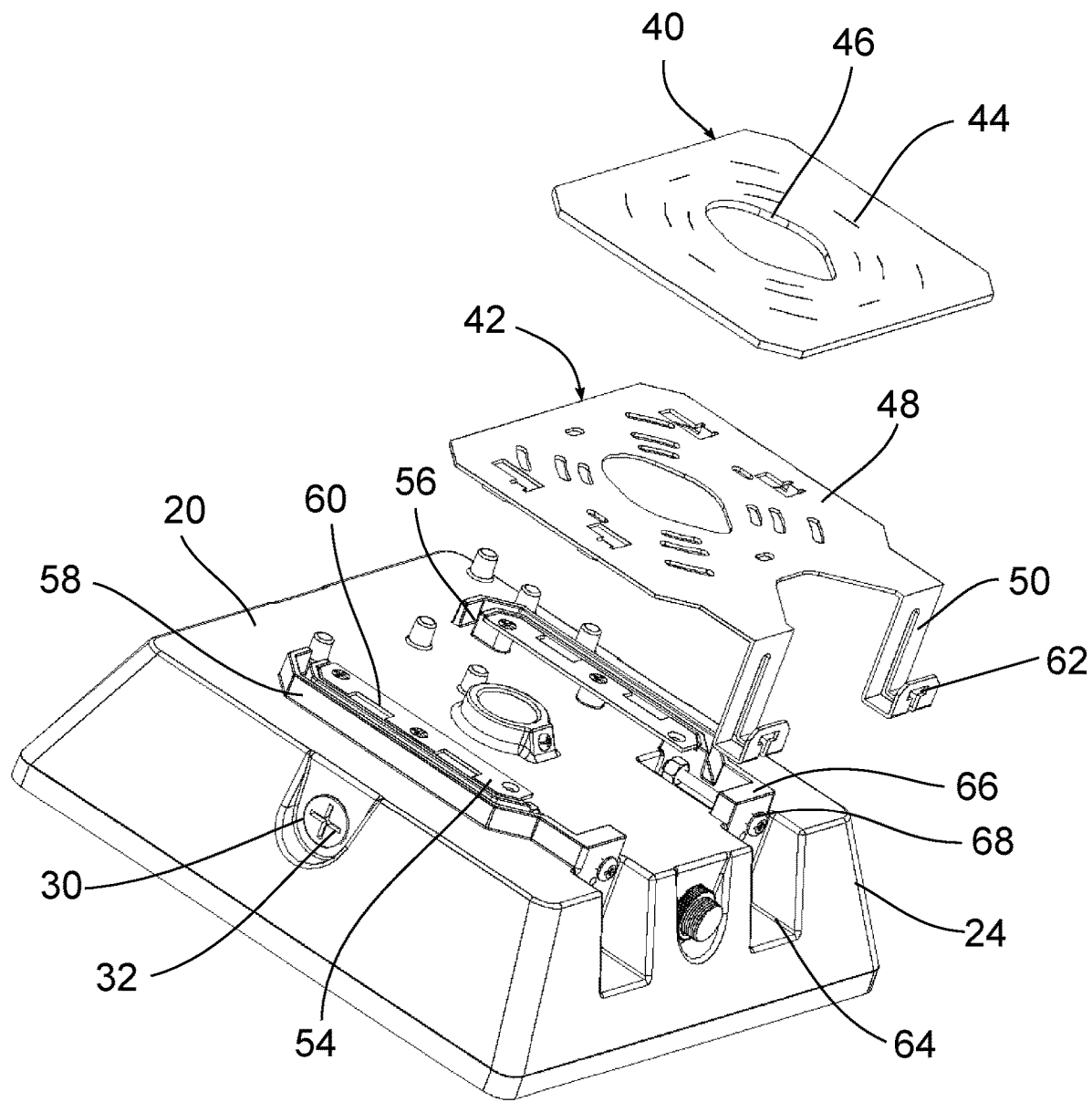
FIG. 5 is an assembly view of the mounting assembly of FIG. 4.
Figure 6:
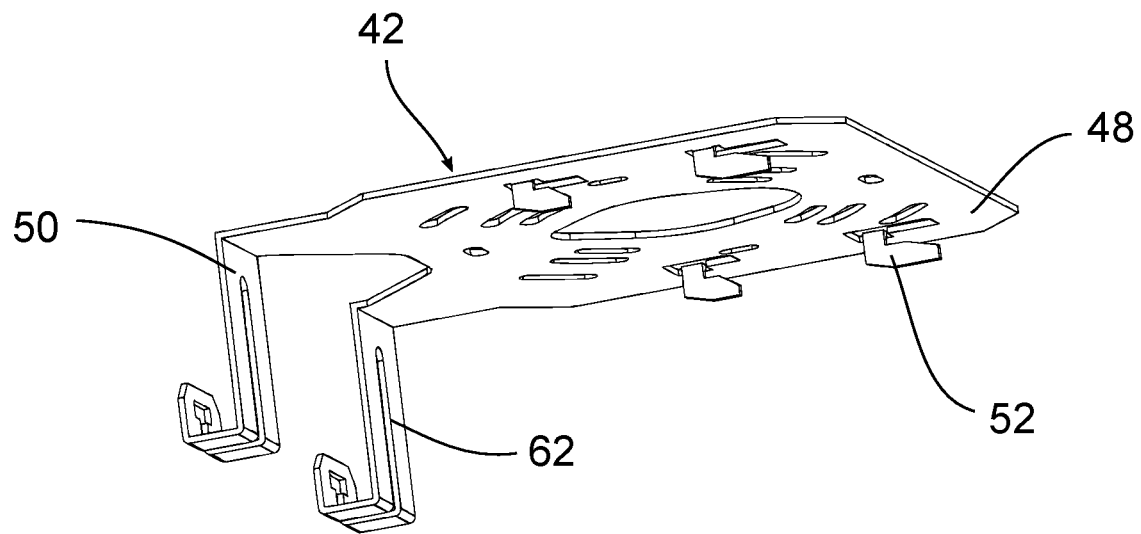
FIG. 6 is a bottom perspective view of an exemplary mounting bracket.

FIGS. 4 and 5 show an exemplary embodiment of a mounting assembly that can be associated with this or other luminaires. The mounting assembly includes a mounting plate 40 and a mounting bracket 42. The mounting plate 40 includes a plurality of connecting features 44 such as openings and slots that can be used to connect the mounting plate 40 to different structures, for example a portion of a canopy structure. In an exemplary embodiment the mounting plate 40 can be connected directly to a junction box. The mounting plate 40 also includes a central opening 46 that can allow conductors to pass through the mounting plate 40 and into the housing 10 through the top aperture 28.

The mounting bracket 42 includes a base 48 and a pair of legs 50 extending from the base 42. The base 48 includes connecting features such as openings and slots that can be used to connect the mounting bracket 42 to the mounting plate 40. The base 42 also includes a set of hooks 52 for connecting to the housing 10. The housing 10 includes a connecting feature for receiving the hooks 52, for example a pair of plates 54 connected to the housing 10. The plates 54 are connected to bosses adjacent respective channels 56 defined by walls 58 extending from the upper wall 20. The plates 54 at least partially defining slots 60 for receiving the hooks 52. The walls 58 help provide support to the mounting plate 42.

The legs 50 each include a key slot 62 having a wider first section and a narrower second section. The housing 10 has a pair of recessed portions 64 that receive the legs 50. A wall 66 borders each recessed portion 64 and a fastener 68 extends through each wall 66 from the recessed portion 64. The key slots 62 are configured so that the heads of the fasteners 68 can extend through the wider portions of the key slots 62 and be connected to the legs through the narrow portions.

According to an exemplary embodiment, the mounting plate 40 is connected to a structure and the mounting bracket 42 is connected to the mounting plate 40. The fasteners 68 can then be inserted into the keyhole slots 62, so that the housing 10 is supported hanging down from the mounting bracket 42. An installer can then make the required electrical connections between the luminaire and a power supply without having to support the housing 10. After the connections are made, the user can position the housing 10 so that the hooks 52 connect to the housing 10. The fasteners 68 can then be tightened to secure the housing 10 to the mounting bracket 42.

Figure 7:
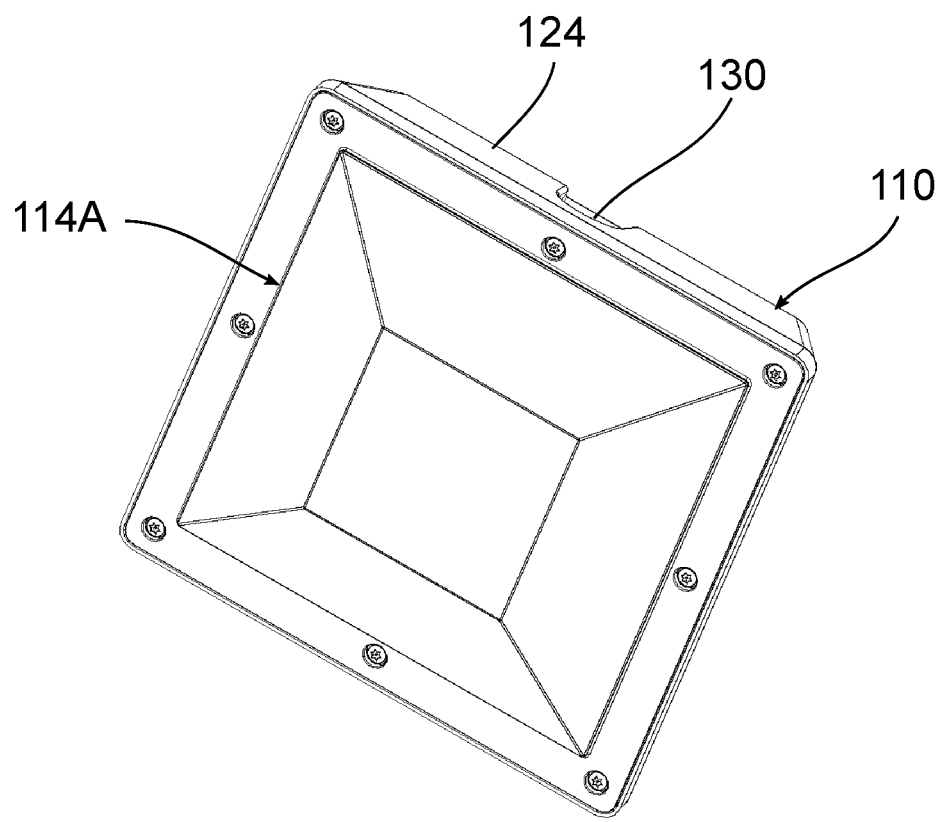
FIG. 7 is a bottom perspective view of another exemplary luminaire with a first lens.
Figure 8:
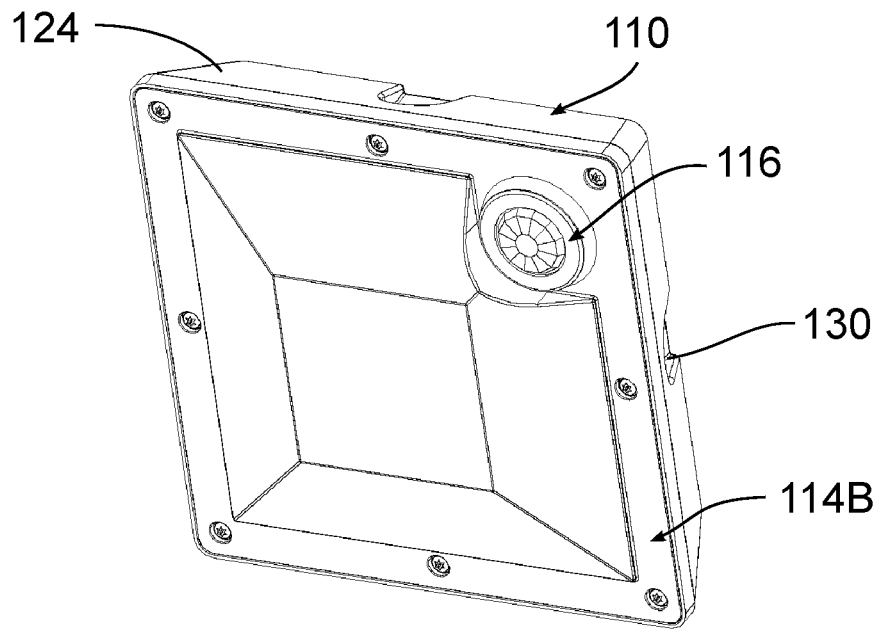
FIG. 8 is a bottom perspective view of the luminaire of FIG. 7 with a sensor and a second lens.
Figure 9:
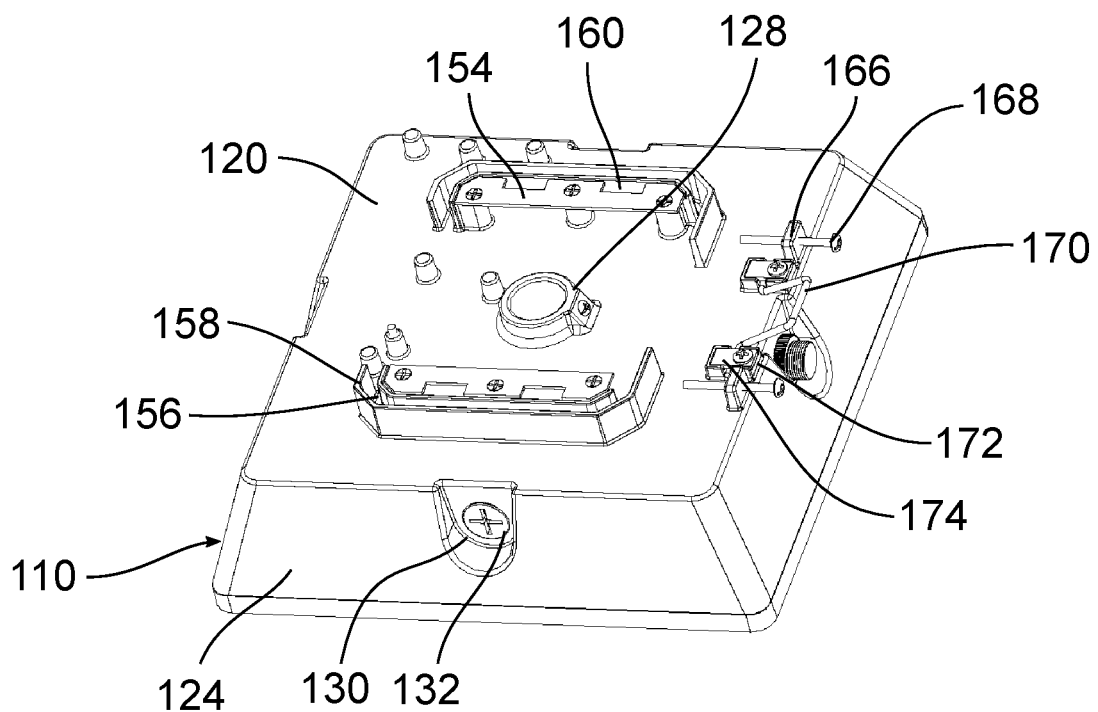
FIG. 9 is atop perspective view of the luminaire of FIG. 8.

FIGS. 7-9 shows another exemplary embodiment of a luminaire having a housing 110, a first lens 114A for use without a sensor and a second lens 114B with a recessed portion for use with a sensor 116. The housing 10 includes an upper wall 120 and a plurality of side walls 124 defining an interior compartment. A top aperture 128 extends through the upper wall and a one or more side apertures 30 extend through one or more of the side walls 124. In an exemplary embodiment, a side aperture 130 is associated with each side wall 124. The top aperture 128 and the side apertures 120 act as conductor conduits. Plugs or gaskets 132 can be positioned in the apertures 128, 130 when not in use. The apertures 128, 130 can also include a threaded portion for example an internal thread. The threaded portion can receive a mounting component, such as a mounting hook or a pendant mount, or other threaded features such as conduits.

The housing 110 includes a connecting feature, for example a pair of plates 154 connected to the housing 110. The plates 154 are connected to bosses adjacent respective channels 156 defined by walls 158 extending from the upper wall 120. The plates 154 at least partially defining slots 160. The walls 158 help provide support for a mounting plate 142. The housing also 110 includes a pair of tabs 166 having openings for receiving fasteners 168. The tabs 166 can include threaded openings so that the position of the fasteners 168 can be rotatably adjusted relative to the tabs 166. A loop member 170 is rotatably connected between the tabs 166. The loop member 170 includes a central bar and a pair of arms. The arms extending into a housing 172 having a removable top plate 174.

Figure 10:
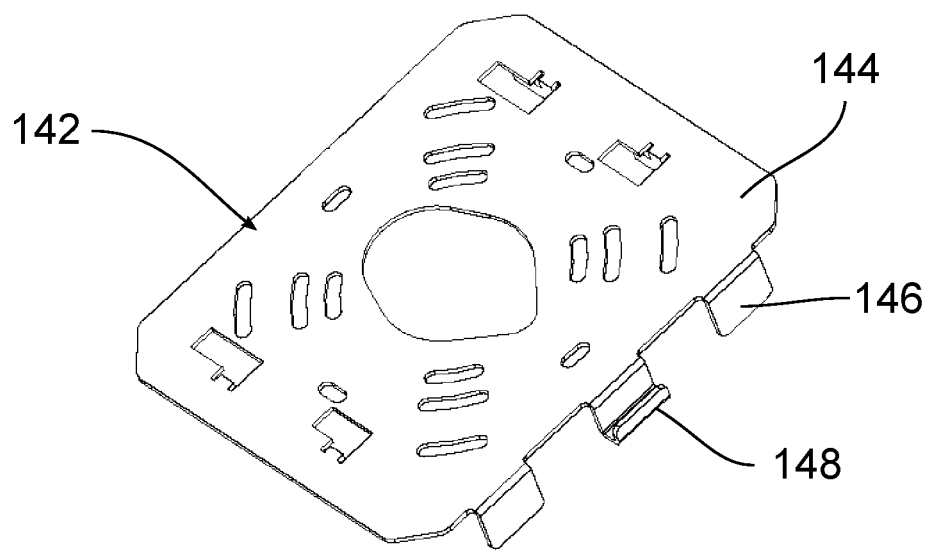
FIG. 10 is a top perspective view of an exemplary mounting bracket.
Figure 11:
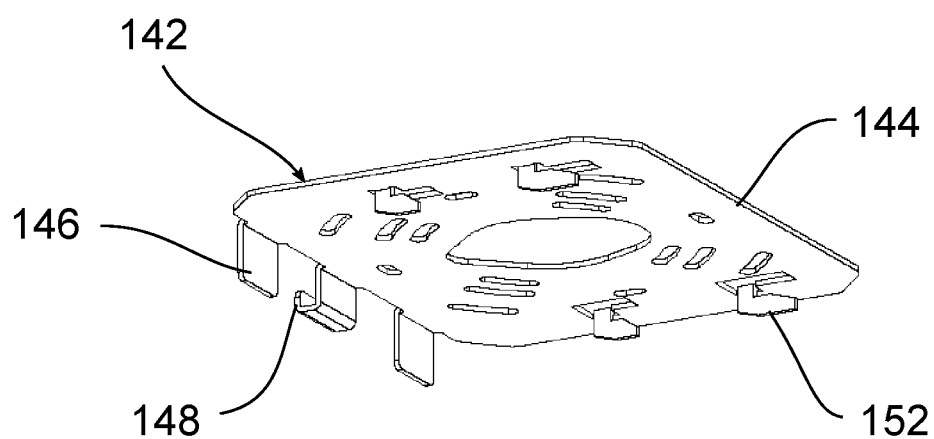
FIG. 11 is a bottom perspective view of FIG. 10.

FIGS. 10 and 11 show another exemplary mounting bracket 142. The mounting bracket 142 includes a base 144 and a pair of tabs 146 and a rear hook 148 extending from the base 144. The base 144 includes connecting features such as openings and slots that can be used to connect the mounting bracket 142 to a mounting plate 20 or other structure. The base 144 also includes a set of hooks 152 for connecting to the housing 110 through the slots 160.

Figure 12:
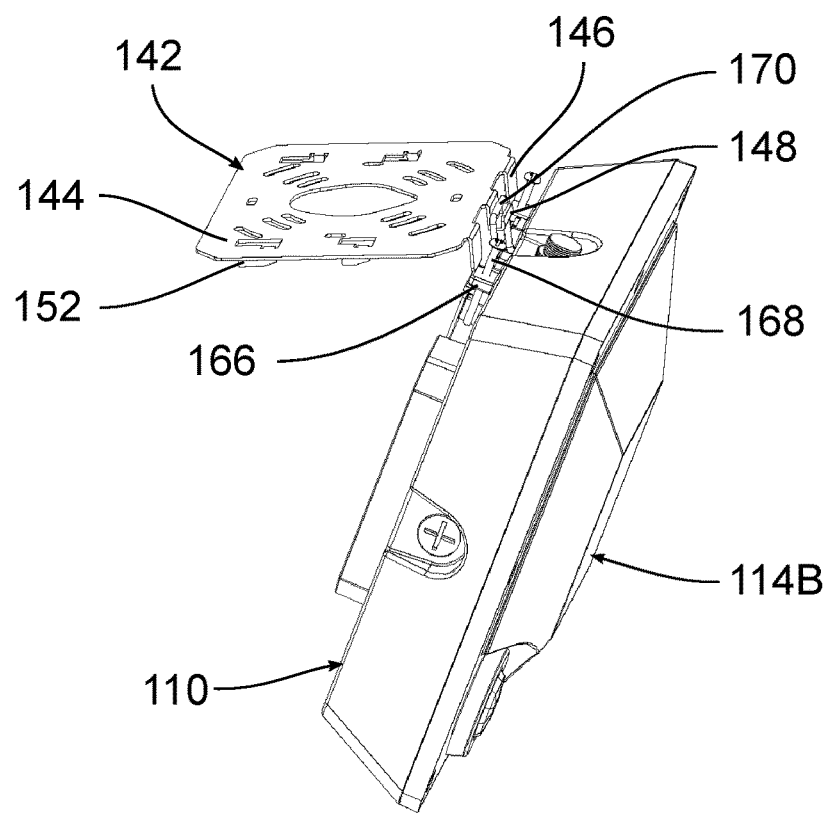
FIG. 12 is a side perspective view of the luminaire hanging from the bracket in an installation position.
Figure 13:
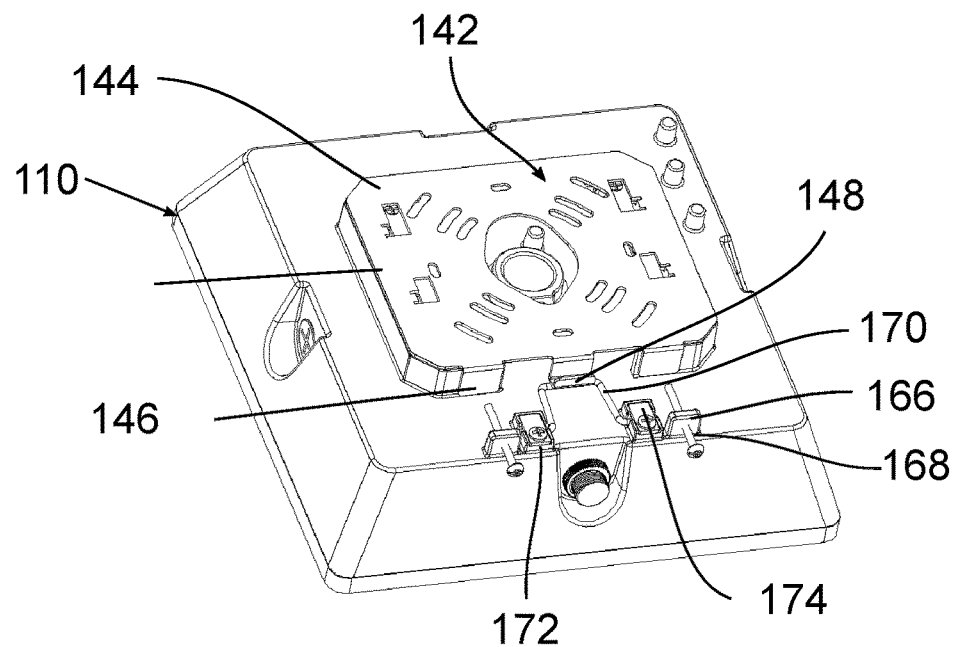
FIG. 13 is atop perspective view of the bracket connected to the luminaire.

According to an exemplary embodiment, the mounting plate 20 is connected to a structure and the mounting bracket 142 is connected to the mounting plate 20. As shown in FIGS. 11 and 12, the rear hook 148 is then connected to the loop member 170, so that the housing 110 is supported hanging down from the mounting bracket 142. An installer can then make the required electrical connections between the luminaire and a power supply without having to support the housing 110. After the connections are made, the user can position the housing 110 so that the hooks 152 connect to the housing 110. The fasteners 168 can then be tightened to engage the tabs 146 and secure the housing 110 to the mounting bracket 142.

Figure 14:
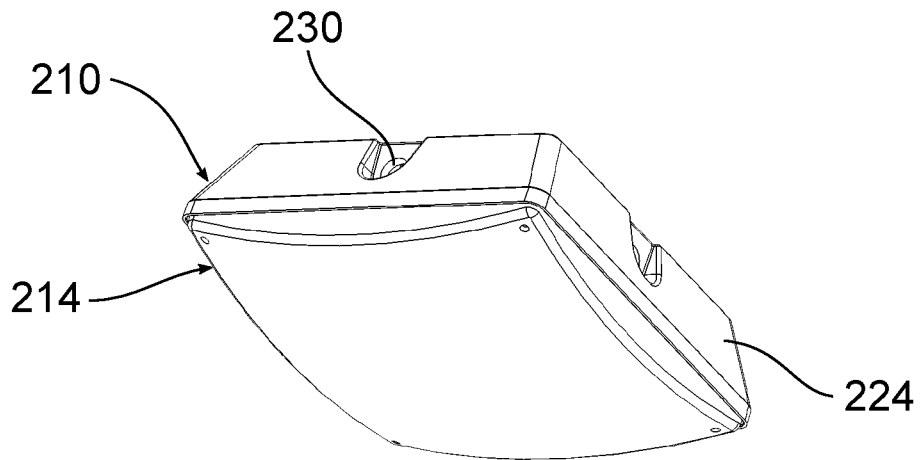
FIG. 14 is a bottom perspective view of another luminaire.
Figure 15:
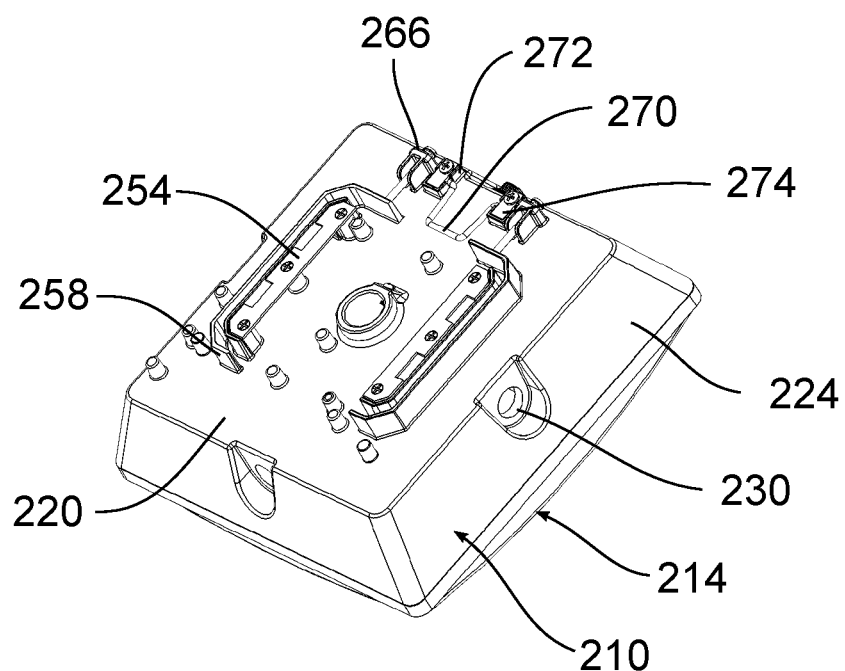
FIG. 15 is a top perspective view of FIG. 14.
Figure 16:
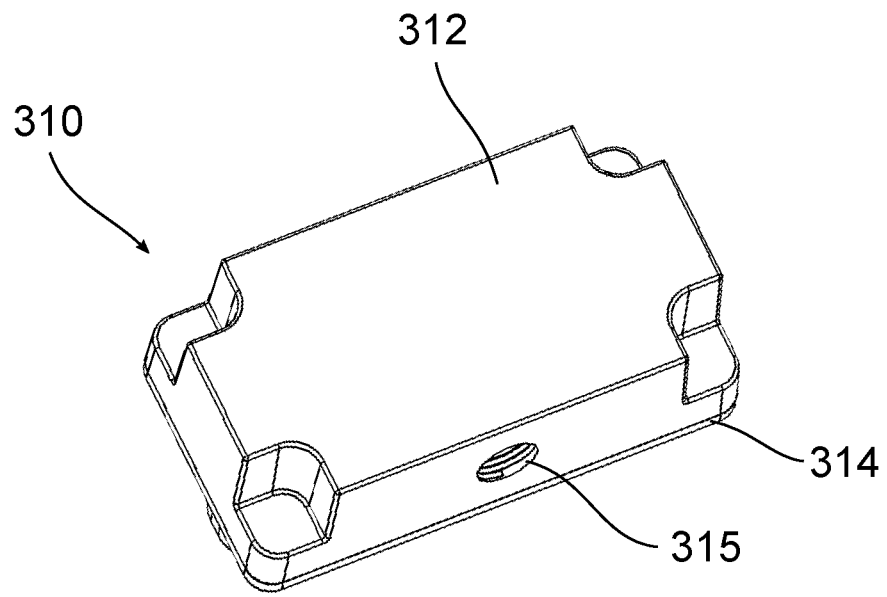
FIG. 16 is a top perspective view of a control module having a first sensor configuration.

FIGS. 14 and 15 show another exemplary embodiment of a luminaire having a housing 210 containing one or more control components, a light emitter 212 connected to the housing 210 and a lens 214 connected to the housing 210. A light emitter can be connected to a lower wall of the housing 210 similar to that shown in FIG. 3. The housing 210 includes an upper wall 220, a lower wall 222, and a plurality of side walls 224 defining an interior compartment. A top aperture 228 extends through the upper wall 220 and one or more side apertures 230 extend through one or more of the side walls 224. In an exemplary embodiment, a side aperture 230 is associated with each side wall 224. The top aperture 228 and the side apertures 220 act as conductor conduits. Plugs or gaskets 232 can be positioned in the apertures 228, 230 when not in use. The apertures 228, 230 can also include a threaded portion for example an internal thread.

The housing 210 includes a connecting feature, for example a pair of plates 254 connected to the housing 210. The plates 254 are connected to bosses adjacent respective channels defined by walls 258 extending from the upper wall 220. The plates 254 at least partially defining slots 260. The walls 258 help provide support for a mounting plate. The housing also 210 includes a pair of protrusions 266 having a back wall with an openings for receiving fasteners 268 and a pair of side walls extending from the back wall. The protrusions 266 can include threaded openings so that the position of the fasteners 168 can be rotatably adjusted relative to the protrusions 266. A loop member 270 is rotatably connected between the protrusions 266. The loop member 270 includes a central bar and a pair of arms. The arms extending into a housing 272 having a removable top plate 274. The housing 210 can be connected to a mounting plate 20 and a mounting bracket 142 as described above.

Figure 17:
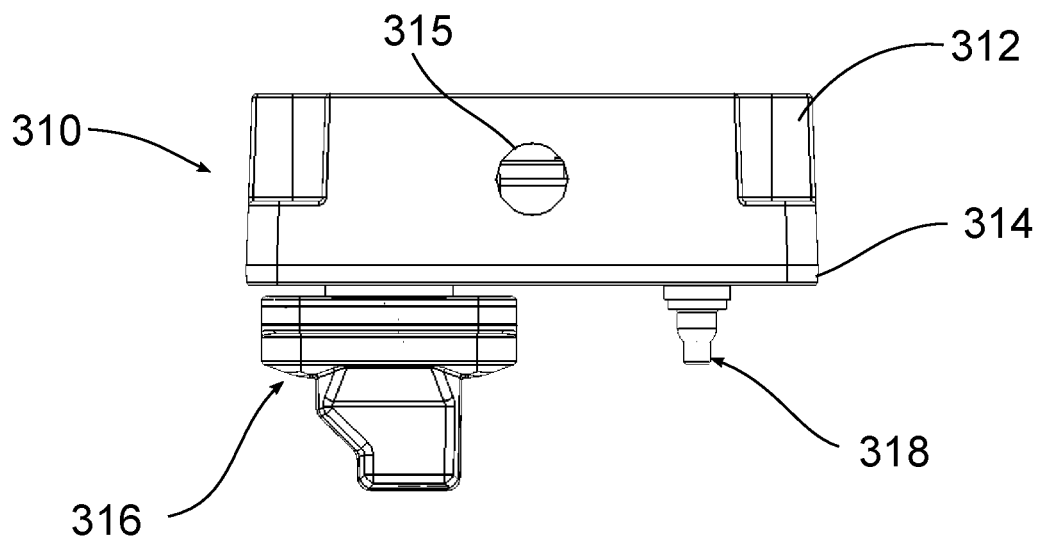
FIG. 17 is a right side view of FIG. 16.
Figure 18:
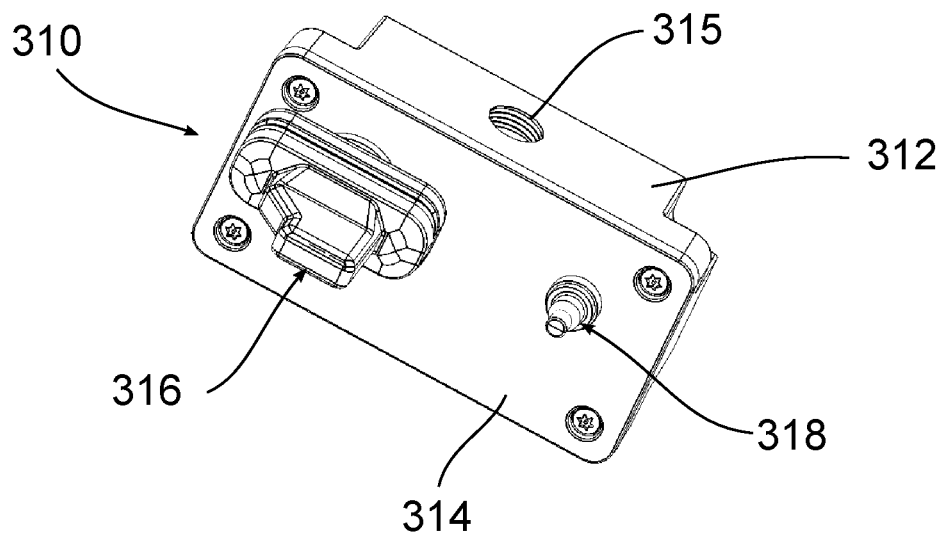
FIG. 18 is a bottom perspective view of FIG. 16.
Figure 19:
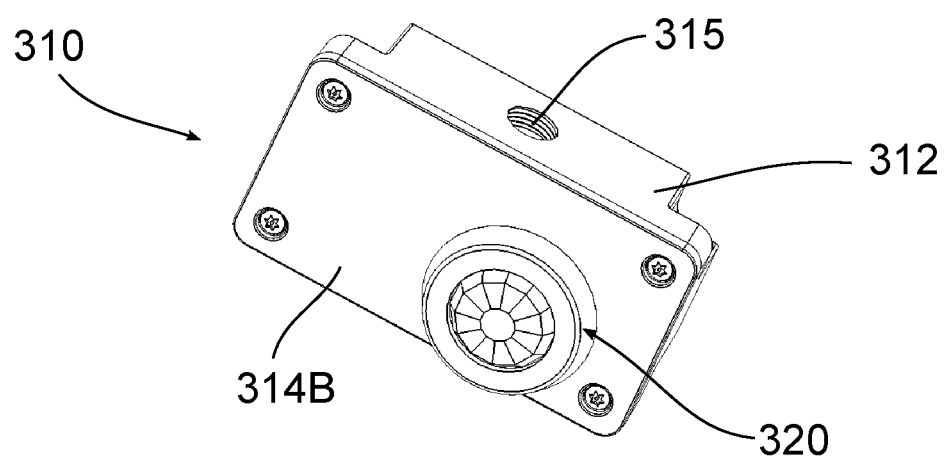
FIG. 19 is a bottom perspective view of the control module having a second sensor configuration.

FIGS. 16-19 show an exemplary embodiment of a control module 310. The control module 310 includes a base 312 having an upper wall and a plurality of side walls. A threaded aperture 315 extends through one of the side walls. A cover plate 314 is connected to the base 312, for example through on or more fasteners. A gasket can be positioned between the plate 314 and the base 312. The base 312 acts as a housing to contain interior components of sensors, while one or more exterior sensor components extend through the plate 314. FIGS. 17 and 18 show an exemplary embodiment of a sensor layout having a controller 316 and a backup battery unit with a test button 318 extending through the plate 314. The controller 316 can be a wireless control component that is capable of modifying the output of the light based on a desired schedule and to communicate with other controllers and or central hubs via a mesh network. An example of a suitable controller 316 is the Beaconnect or SiteSync controllers by Hubbell Lighting. In certain embodiments, the controller 316 and battery backup units 318 can be in separate control modules 310. FIG. 19 shows another exemplary embodiment of a sensor layout having an occupancy or motion sensor 320 extending through a plate 314B. Different plates can be used depending on the sensor configuration. Also, gaskets can be used to provide a seal between the plates 314 and the sensor components.

Figure 20:
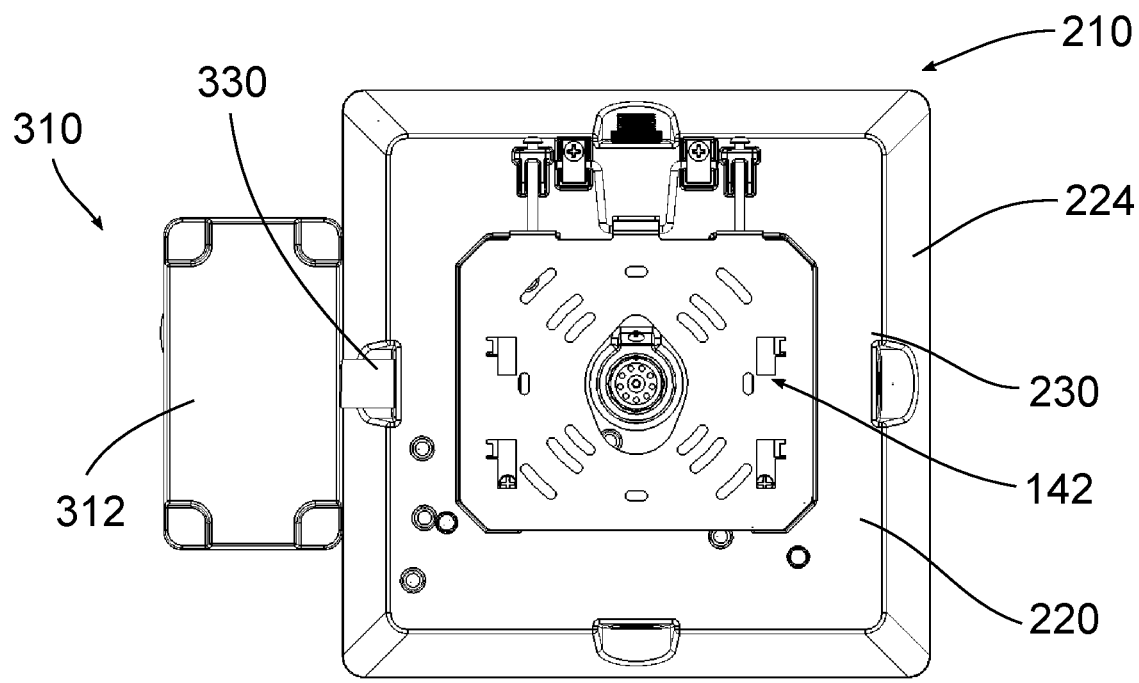
FIG. 20 is a top view of the control module connected to the luminaire of FIG. 14.
Figure 21:
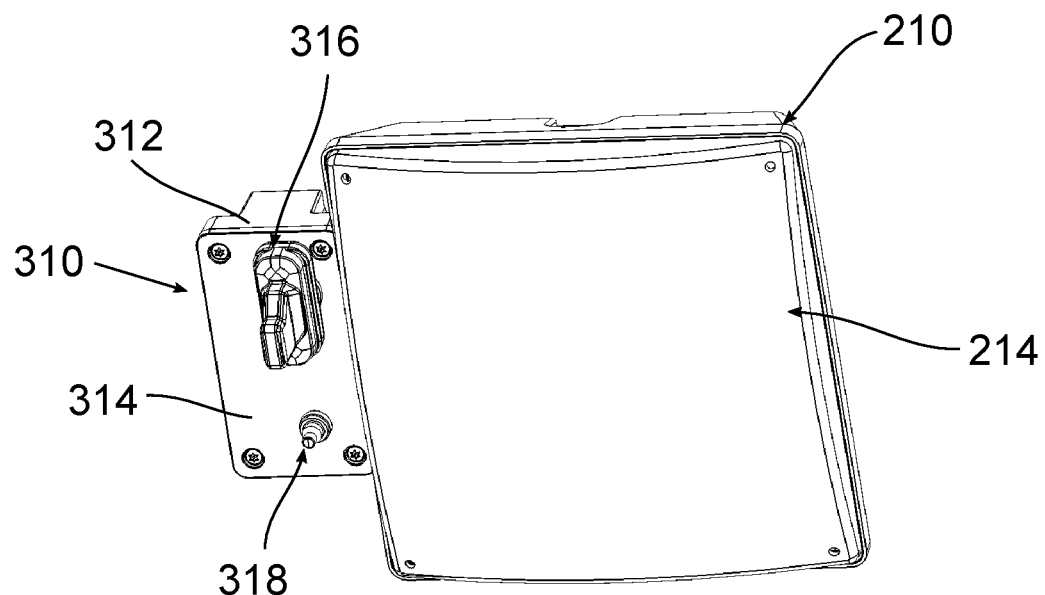
FIG. 21 is a bottom perspective view of FIG. 20.

As best shown in FIGS. 20 and 21, a connector 330 can connect the control module 310 to one of the side walls 224 of the housing 210. In an exemplary embodiment, the connector 330 is a tubular member having a first end threadably connected to the threaded aperture 315 of the control module 310 and a second end threadably connected to the threaded aperture 230 of the housing 210. One or more conductors can extend through the connector 330 to operatively connect sensor component in the control module 310 to a power source or to one or more control components positioned in the luminaire housing 210. The control module 310 can be connected to any side of the housing 210. In some embodiments, more than one control module 310 can be connected to a housing 210, with the different sensor modules containing different sensor components or configurations as needed. For example, two control modules 310 can be connected to the housing 210 with one control module 310 containing the controller 316 and battery backup unit 318 and the other control module 310 containing the motion sensor 320.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A luminaire comprising:
   a luminaire housing including an upper wall, a plurality of side walls defining a first interior;
   a light emitter connected to the luminaire housing; and
   a control module adapted to adjust an operation of the light emitter and including a base and a cover defining a second interior, and a control component positioned in the second interior, wherein the control module is connected to an exterior of the luminaire housing, wherein the luminaire housing includes a plurality of removable plugs, wherein removal of one of the plugs forms an aperture providing communication with the first interior, and wherein the control module is connectable to the luminaire housing through the aperture after removal of one of the plugs.

2. The luminaire of claim 1, wherein the plug is configured to be re-insertable into the aperture after removal.

3. The luminaire of claim 1, wherein one of the side walls includes a first threaded aperture and the base includes a second threaded aperture, and further comprising a connector threadably connected to the first threaded aperture and threadably connected to the second threaded aperture.

4. The luminaire of claim 3, wherein the connector is configured to permit the passage of one or more conductors.

5. The luminaire of claim 1, wherein the control component includes a controller configured for wireless communication.

6. The luminaire of claim 1, wherein the control component includes an occupancy sensor.

7. The luminaire of claim 1, wherein a driver is positioned in the first interior and the control component is operably connected to the driver.

8. The luminaire of claim 1, further comprising a second control module connected to the luminaire housing.

9. A luminaire comprising:
   a luminaire housing including an upper wall and a plurality of side walls defining a first interior;
   a light emitter connected to the luminaire housing; and a control module having a control module housing attached to an exterior of the luminaire housing and defining a second interior, the control module is adapted to adjust an operation of the light emitter, and the control module including a controller positioned at least partially in the second interior and configured for wireless communication.

10. The luminaire of claim 9, wherein the control module includes a backup battery unit.

11. The luminaire of claim 9, wherein the control module includes a test button accessible on an exterior of the control module.

12. The luminaire of claim 9, wherein the control module includes a base and a cover plate.

13. The luminaire of claim 9, wherein the controller is configured for wireless mesh network communication.

14. The luminaire of claim 9, wherein the controller is configured to modify the output of the light emitter based on a schedule.

15. The luminaire of claim 9, further comprising a second control module connected to the luminaire housing.

16. The luminaire of claim 15, wherein the second control module includes an occupancy sensor.

17. The luminaire of claim 9, wherein the luminaire housing includes a plurality of removable plugs, wherein removal of one of the plugs forms an aperture providing communication with the first interior, and wherein the control module is connectable to luminaire housing through the aperture after removal of one of the plugs.

18. A luminaire comprising:
a luminaire housing including a plurality of side walls at least partially defining a first interior;
a light emitter connected to the luminaire housing;
a lens connected to the luminaire housing over the light emitter; and
a control module assembly adapted to adjust an operation of the light emitter and connected to luminaire housing, wherein the control module assembly includes a base and a first cover plate having a first configuration selectively connectable to the base, or a second cover plate having a second configuration selectively connectable to the base, wherein the first configuration includes an opening for a controller having a wireless communication module and the second configuration includes an opening for an occupancy sensor.

19. The luminaire or claim 18, wherein the controller is configured for wireless mesh network communication.

20. The luminaire or claim 18, wherein the first configuration includes a backup battery unit.

* * * * *